United States Patent [19]

Lauterwasser et al.

[11] Patent Number: 4,582,180
[45] Date of Patent: Apr. 15, 1986

[54] HYDRAULIC ACTUATOR FOR A BRAKE

[75] Inventors: Armin Lauterwasser, Krez; Hans Madzgalla, Koblenz; Albert Langert, Neuwied, all of Fed. Rep. of Germany

[73] Assignee: Lucas Industries public limited company, Birmingham, England

[21] Appl. No.: 440,176

[22] Filed: Nov. 8, 1982

[30] Foreign Application Priority Data

Nov. 11, 1981 [DE] Fed. Rep. of Germany ....... 3144868

[51] Int. Cl.$^4$ ............................................. F16D 65/78
[52] U.S. Cl. ................................. 188/264 G; 92/168; 188/370
[58] Field of Search .............. 74/18.2; 192/98, 110 B; 92/172, 176, 168, 248; 188/72.31, 72.4, 72.5, 264 AA, 264 R, 264 G, 370, 71.6

[56] References Cited

U.S. PATENT DOCUMENTS

| | | | |
|---|---|---|---|
| 3,432,010 | 3/1969 | Hemus | 188/370 |
| 3,592,303 | 7/1971 | Tincher | 188/264 G |
| 3,998,466 | 12/1976 | Kondo | 92/168 |
| 4,401,012 | 8/1983 | Emmett | 92/248 |
| 4,431,090 | 2/1984 | Kinoshita | 188/264 G |
| 4,527,672 | 7/1985 | Schreiner et al. | 188/264 G |

FOREIGN PATENT DOCUMENTS 1031946  6/1966  United Kingdom ........... 188/264 G

Primary Examiner—Duane A. Reger
Assistant Examiner—Alvin Oberley
Attorney, Agent, or Firm—Scrivener Clarke Scrivener and Johnson

[57] ABSTRACT

The actuator comprises a piston (34) which has a stepped portion (36) formed with an annular groove (38) at its end projecting out of a cylinder (16). An annular protective sheet (50) is slipped on the stepped portion (36) and it comprises at its radially inner edge (52) inwardly projecting, resilient tongues (54) which are arrested in the annular groove (38). An annular elastic sleeve (46) is arranged behind the protective sheet (50), thereby being protected against heat, and provides sealing as against the piston (34), on the one hand, and the cylinder (16), on the other hand.

6 Claims, 6 Drawing Figures

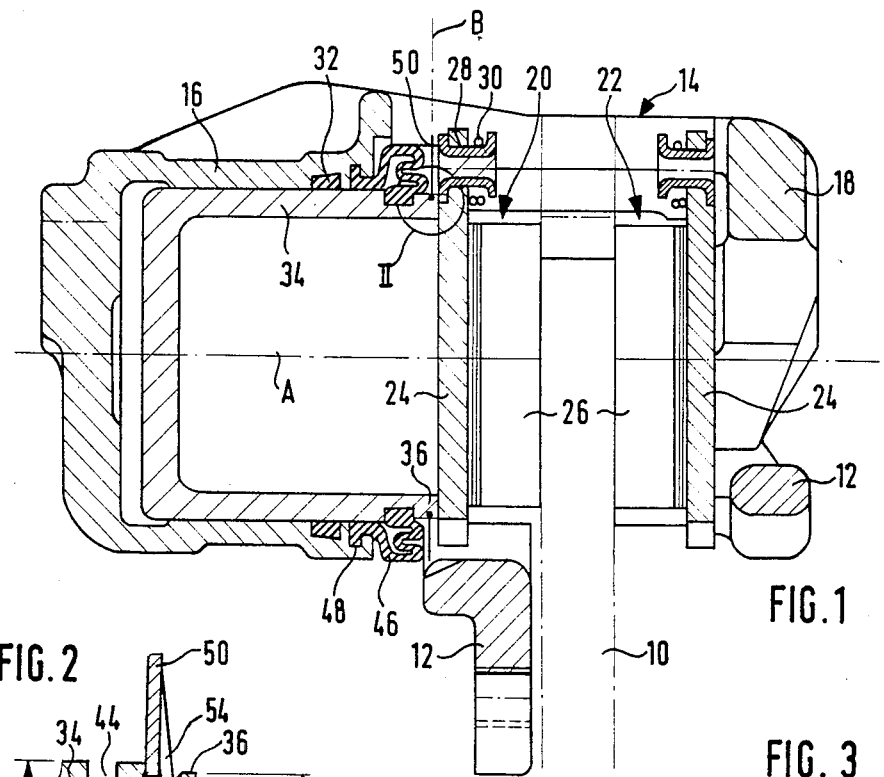
FIG. 1
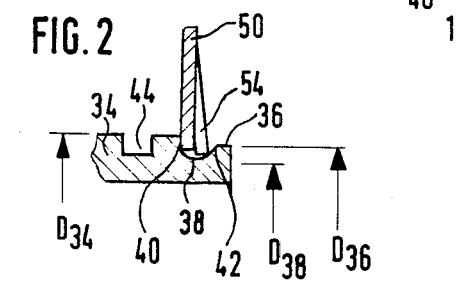
FIG. 2
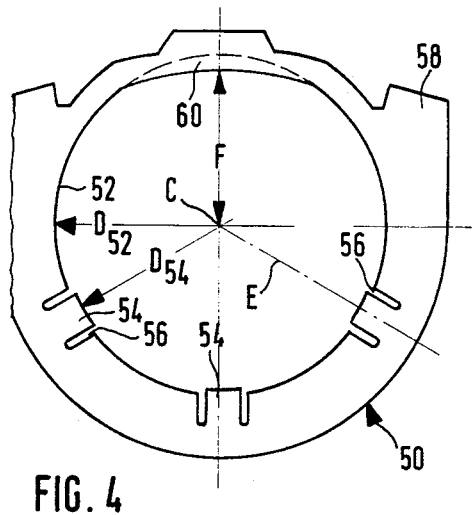
FIG. 4
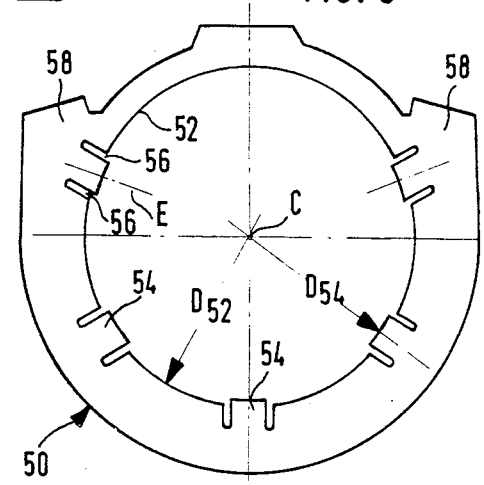
FIG. 3
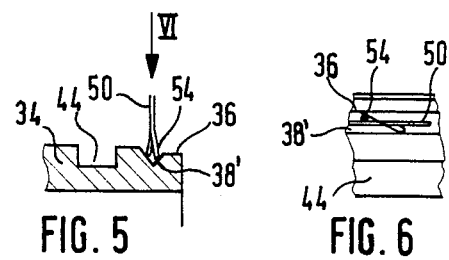
FIG. 5   FIG. 6

HYDRAULIC ACTUATOR FOR A BRAKE

The invention relates to an hydraulic actuator for a brake, in particular a spot-type disc brake for motor vehicles, comprising a piston which has a stepped portion at its front end projecting out of a cylinder for engagement with a brake pad, an annular protective sheet which is slipped from the front on the outer surface of the stepped portion, and an annular elastic sleeve which is arranged behind the protective sleeve and provides sealing between its radially inner edge and the piston as well as between its radially outer edge and the cylinder.

In a known actuator of this kind (German utility model DE-GM No. 71 47 508) the radially inner edge of the protective sheet is formed with a cylindrical collar, the inside face of which is in engagement with a cylindrical outer surface of the stepped portion formed in the piston and which is itself enclosed by a collar of the sleeve. The front side of the protective sheet lies in the same plane as the front end face of the piston so that together the two faces lie against a backplate of the corresponding brake pad. Upon braking for any extended period of time, therefore, the protective sheet becomes heated almost as much as the backplate. For this reason the sleeve disposed in abutment with the backside of the protective sheet is exposed quite considerably to heat both by radiation and direct heat transfer from the protective sheet. The sleeve thus may age quickly if vigorous braking occurs frequently, involving a corresponding strong development of heat.

The same is true of other known actuators (DE-AS No. 12 07 160 and DE-OS No. 22 36 420) which essentially differ from the kind specified initially in that they comprise an annular or cup-shaped protective sheet having a cylindrical collar or wall portion in engagement with the inner wall of the piston which is cup-shaped, having its open end protrude out of the cylinder.

In these cases the annular front end face of the piston is covered entirely by the protective sheet so that it is only by way of the protective sheet that the piston acts on the associated brake pad. Whenever the brakes are applied, therefore, the protective sheet reaches the temperature of the backplate still faster so that the influence of heat on the sleeve is even more pronounced than with the known device described first.

What applies to all the known devices described above, further is the fact that the protective sheet acts like a spring between the piston and the adjacent brake pad when it has become corrugated or distorted frusto-conically, especially by being heated. This spring action of the protective sheet causes the piston to be retracted further into the cylinder away from the brake pad upon release of the brake than would be the case without the deformation of the protective sheet. The next actuation of the brake thus requires a greater amount of brake fluid to be supplied to the cylinder; this means that the pedal deflection needed to apply the brakes becomes greater than it would be without this spring action of the protective sheet. Furthermore, in the case of the prior art described above, the protective sheet either may be difficult to mount or be so loosely fixed that it rattles, depending on accidentally coincident diameter tolerances of the piston front end, on the one hand, and of the cylindrical collar or wall portion of the protective sheet, on the other hand.

It is, therefore, an object of the invention to develop an hydraulic actuator of the kind specified initially such that the protective sheet can be fixed reliably in simple manner, does not exert any return forces on the piston if deformed, and thus affords better protection of the sleeve against heat transfer and radiation.

The object is met, in accordance with the invention, in that the stepped portion has an annular groove in an outer surface, and in that the protective sheet comprises resilient tongues projecting inwardly beyond its radially inner edge and being arrested in the annular groove, whereby the protective sheet is held spaced from the brake pad.

The invention in particular has the following advantages:

(a) Even if unfavorable diameter tolerances coincide, the protective sheet may be pushed on to the stepped portion of the piston and the resilient tongues may be snapped into the annular groove by hand or by means of a simple device, without any particular effort or attention.

(b) Upon arresting of the tongues in the annular groove the protective sheet is held positively in position.

(c) As the protective sheet cannot contact the associated brake pad, the brake acuating and return forces are transmitted exclusively by the front end face of the piston directly to the respective brake pad.

(d) The protective sheet does not take part in the transmission of axial actuating or return forces even if the front end face of the piston should have forced its way into a vibration dampening lining at the rear of the adjacent brake pad or the backplate thereof.

(e) Air circulates at both sides of the protective sheet so that it becomes heated relatively little during braking. Accordingly, there is only little heat which may act on the sleeve from the part of the protective sheet. The effect of heat from the brake pad via the piston on the sleeve is reduced by the annular groove formed in the stepped portion of the piston and is reduced still further by the protective sheet, acting like a cooling fin, the greater the surface area is by which the protective sheet touches a groove side face of the annular groove.

The invention preferably is developed further in that the annular groove formed in the stepped portion is defined by radially inwardly converging groove side faces, and at least parts of the resilient tongues are bent out of the plane of the protective sheet, thereby being clamped between the groove side faces. This further development has the additional advantage that very great manufacturing tolerances are admissible between the harmonized dimensions of the annular groove, on the one hand, and the protective sheet, on the other hand, without any risk of having a rattling protective sheet in operation.

The rear groove side face preferably lies in a radial plane. In this event convergence of the two groove side faces is obtained by an inclination of the front groove side face only.

It is particularly advantageous in this context if the resilient tongues are bent uniformly to the front. Then the protective sheet engages the rear groove side face with a relatively great ring surface, interrupted only by the bent-away tongues, thus affording good heat transfer between the piston and the protective sheet.

However, the resilient tongues also may be set or crossed with respect to one another so that alternating tongues abut the front and rear groove side faces of the annular groove formed in the stepped portion of the piston.

As an alternative, each resilient tongue may be twisted about a radial axis of its own. In this manner each tongue will engage the front groove side face by its front edge and the rear groove side face by its rear edge.

As compared to these variant embodiments, however, the arrangement as described having the uniformly forwardly bent tongues in general will be preferred, among others because of the ease of manufacture it offers. With actuators according to the invention produced in greater series, the assembly of the protective sheet is easy to effect mechanically or even automatically because the resilient tongues simply snap into the annular groove formed in the stepped portion of the piston. To this end it is favorable to distribute the resilient tongues as uniformly as possible over the greatest possible angular extent of the inner edge of the protective sheet, the only thing to be taken care of being not to cause excessive weakening of the annular protective sheet in areas of little radial width.

Contrary to that, assembly by hand is facilitated if all resilient tongues are located in a sector of the annular protective sheet extending throughout a maximum of 180° and if the inner edge of the protective sheet is spaced less from the center in an area opposite this sector. In this event the protective sheet is assembled by first being placed obliquely on the stepped portion of the piston and the area in question is inserted into the annular groove. Only then the sector mentioned is pushed on so far that the resilient tongues formed only this sector become arrested in the annular groove.

Finally, it is advantageous to provide the piston with a second annular groove, spaced axially behind the annular groove already mentioned, to take up the radially inner edge of the sleeve in per se known manner.

Embodiments of the invention will be described below, with reference to diagrammatic drawings, in which:

FIG. 1 is an axial section of a spot-type disc brake for motor vehicles;

FIG. 2 is the section II of FIG. 1 on an enlarged scale;

FIG. 3 is the front view of a protective sheet shown in FIGS. 1 and 2;

FIG. 4 is a view corresponding to FIG. 3 of a modified embodiment of the protective sheet;

FIG. 5 is a variant of FIG. 2; and

FIG. 6 is a partial view in the direction of the arrow VI in FIG. 5.

A brake disc 10 is coordinated with the brake illustrated which comprises a brake carrier 12 adapted to be fixed to an axle leg or axle casing (not shown) of a motor vehicle and straddling the outer edge of the brake disc 10. A floating caliper 14 is guided for displacement parallel to the axis of rotation of the brake disc 10 at the brake carrier. The floating caliper 14 also straddles the outer edge of the brake disc 10. A cylinder 16 having an axis A parallel to the axis of rotation of the brake disc is formed at one side of the floating caliper 14, namely the side inboard of the vehicle, while at the other side, outboard of the vehicle, there is leg 18 which projects radially inwardly with respect to the brake disc.

Within the floating caliper 14 and at one side each of the brake disc 10 two brake pads 20 and 22 are provided which each comprise a steel backplate 24 and a friction lining 26. Both brake pads 20 and 22 are supported directly at the brake carrier 12 by their respective backplate 24 so as to be fixed against movements in circumferential direction of the brake disc 10. Furthermore, both brake pads 20 and 22 are suspended in the usual way by a pair of pins (not shown) extending parallel to the axis and releasably secured to the floating caliper 14, which pins prevent any radial movement of the brake pads. A hollow rivet 28 is fixed in parallel with the axis in an area of the backplate 24 free of friction lining 26 of each brake pad 20 and 22, and it carries a retaining spring 30 the legs of which are supported in per se known manner on said pins to prevent rattling of the brake pads 20 and 22 in case of shocks.

A cup-shaped piston 34 is guided in the cylinder 16, being sealed by a sealing ring 32. The open front end of the piston protrudes from the cylinder and has a stepped portion 36, the outer diameter $D_{36}$ of which is smaller than the outer diameter $D_{34}$ of the main portion of the piston 34. An annular groove 38 is formed in the stepped portion 36 and is defined by a rear groove side face 40 and a front groove side face 42. As shown in FIG. 2, the rear groove side face 40 lies in a plane at right angles to the axis A, while the front groove side face 42 is a rearwardly tapering conical surface, narrowing to the left in the drawing, to thereby converge with the rear groove side face 40. As may be taken from FIG. 2, the base of the annular groove 38 is rounded so as to avoid notch stress.

As shown in FIG. 5, the annular groove 38 formed in the stepped portion 36 of the piston 34 according to FIG. 2 may be replaced by an annular groove 38' which is limited at both sides by conical surfaces. As an alternative, an annular groove may be provided which is U-shaped in cross section, in other words defined by parallel groove side faces. Yet the embodiment shown in FIG. 2 has proved to be particularly useful.

A second annular groove 44 is formed in the piston 34, spaced behind the annular groove 38 or 38' and having a U-shaped cross section in the embodiments illustrated. This second annular groove 44 receives the bead-like radially inner edge of a sleeve 46 made of rubber or an elastic plastic material. The radially outer edge thereof is embedded in an annular groove 48 formed in the cylinder 16.

As shown in FIG. 1, the sleeve 46 is protected by a protective sheet 50 secured on the stepped portion 36 of the piston 34 in front of the sleeve 46 against any direct contact of the backplate 24 of the adjacent brake pad 20 and against heat radiation. The protective sheet 50 substantially is disposed in a plane B at right angles to the axis A and has a substantially circular radially inner edge 52, the center C of which is located on the axis A. The diameter $D_{52}$ of the inner edge 52 is noticeably smaller than the diameter $D_{34}$ of the piston 34, yet a little greater than the diameter $D_{36}$ of the stepped portion 36.

The protective sheet 50 comprises a plurality of resilient tongues 54 arranged angularly spaced from one another and each being designed symmetrically with respect to a radial axis E, and each tongue being limited by two slots 56 which extend parallel to said axis E, and being bent out of the plane B. The radially inner edges of the tongues 54 are located on a circle whose diameter $D_{54}$ is smaller than the diameter $D_{36}$ of the stepped portion 36, yet somewhat greater than the base diameter $D_{38}$ of the annular groove 38.

The resilient tongues 54 may be bent in different manner out of the plane B of the main portion of the protective sheet 50. The tongues 54 are particularly easy to make and convenient in effect if they are all bent to the front, as shown in FIG. 2, away from the cylinder 16 and out of the plane B. In this case the protective sheet 50 abuts the rear groove side face 40 by portions of ring sector shape of considerable size, while the radially inner edges of the tongues 54 are supported at the front groove side face 42, thereby centering the protective sheet 50 with respect to the piston 34 and securing it against rattling.

However, the tongues 54 also may be bent alternatingly to the front and rear so as to be alternatingly in engagement with the rear and front groove side faces 40 and 42, respectively. This crossed or set arrangement of the tongues 54 is particularly useful for preventing relative rotation of the piston 34 with respect to the protective sheet 50. Of course, this is important only if the front end face of the piston 34 has a recess, for instance, of sector shape intended to prevent squeeking noise and, consequently, a certain angular position must be maintained. Outer projections 58 formed at the protective sheet 50 prevent the same from rotating with respect to the floating caliper 14 about the axis A. Consequently the protective sheet 50 can also prevent the piston 34 from rotating about axis A when the tongues firmly grip the groove side faces 40 and 42, for example, by virtue of their crossed arrangement described.

The latter also may be achieved by the variant of the resilient tongues 54 shown in FIGS. 5 and 6 according to which each tongue is twisted in itself about its own radial axis E. This twisting as well as the double-sided crossed arrangement of the tongues 54, however, precludes the rather large-area engagement between the protective sheet 50 and the rear groove side face 40 obtained according to FIG. 2 and generally preferred because of the relatively good heat transfer thus achievable from the piston 34 to the protective sheet 50.

The exclusive use of tongues 54 bent to the front and away from the cylinder 16, as shown in FIG. 2, is especially useful also as regards the mounting of the protective sheet 50. If the protective sheet 50 comprises only tongues 54 bent forwardly, it can be centered easily by its radially inner edge 52 on the stepped portion 36 before any greater axial force is exerted by which the resilient tongues are bent further forwardly elastically so as to evade the front section of the stepped portion 36 as the protective sheet 50 is slipped into place. Subsequently the tongues are arrested in the annular groove 38 as soon as the sections of the radially inner edge 52 located between the tongues 54 have been pressed under a certain force against the rear groove side face 40.

Especially well suited for assembly by hand is the embodiment of the protective sheet 50 shown in FIG. 4 which is modified as compared to FIG. 3 and includes only three resilient tongues 54 all disposed in a sector of 120°. Opposite the central line of this sector an area 60 is provided in which the radially inner edge 52 of the protective sheet 50 deviates inwardly from its circular configuration to reach a minimum distance F from the center C which is less than half the diameter $D_{52}$. This area 60 may be used to insert the protective sheet 50 into the annular groove 38 before the resilient tongues 54 are pressed on the stepped portion 36 and caused to become locked in the annular groove 38.

What is claimed is:

1. A hydraulic actuator for a spot-type disc brake for a motor vehicle, comprising
    a piston having a stepped portion projecting out of a cylinder, said stepped portion having a front end engageable with a brake pad, the stepped portion having in its outer surface an annular groove spaced axially rearwardly of said front end and being defined by a pair of side faces,
    an annular protective sheet having front and rear faces and which has a radially inner edge and is arrested in said annular groove,
    and an annular elastic sleeve which is arranged behind the protective sheet and provides sealing between its radially inner edge and the piston as well as between its radially outer edge and the cylinder, said protective sheet being substantially planar and located in a plane such that its front face is spaced behind and away from the brake pad, the protective sheet including rsilient tongues projecting inwardly beyond its radially inner edge, at least part of the resilient tongues being bent out of the plane of the remainder of the protective sheet and being clampingly received between the groove side faces, the radially inner edge of the sleeve being axially spaced behind and away from the annular groove, said sheet being arranged that, during use, air circulates at both sides of said sheet, the rear side face of said groove lying in a radial plane and the resilient tongues being bent uniformly to the front thus engaging the front side face of said groove.

2. A hydraulic actuator for a spot-type disc brake for a motor vehicle, comprising
    a piston having a stepped portion projecting out of a cylinder, said stepped portion having a front end engageable with a brake pad, the stepped portion having in its outer surface an annular groove spaced axially rearwardly of said front end and being defined by a pair of side faces,
    an annular protective sheet having front and rear faces and which has a radially inner edge and is arrested in said annular groove,
    and an annular elastic sleeve which is arranged behind the protective sheet and provides sealing between its radially inner edge and the piston as well as between its radially outer edge and the cylinder, said protective sheet being substantially planar and located in a plane such that its front face is spaced behind and away from the brake pad, the protective sheet including resilient tongues projecting inwardly beyond its radially inner edge, at least part of the resilient tongues being bent out of the plane of the remainder of the protective sheet and being clampingly received between the groove side faces, the radially inner edge of the sleeve being axially spaced behind and away from the annular groove, said sheet being arranged that, during use, air circulates at both sides of said sheet, said resilient tongues being crossed with respect to one another so as to alternately engage the front and rear side faces of said groove.

3. A hydraulic actuator for a spot-type disc brake for a motor vehicle, comprising
    a piston having a stepped portion projecting out of a cylinder, said stepped portion having a front end engageable with a brake pad, the stepped portion having in its outer surface an annular groove spaced axially rearwardly of said front end and being defined by a pair of side faces, an annular protective sheet having front and rear faces and which has a radially inner edge and is arrested in said annular groove, and an annular elastic sleeve which is arranged behind the protective sheet and provides sealing between its radially inner edge and the piston as well as between its radially outer edge and the cylinder said protective sheet being substantially planar and located in a plane such that its front face is spaced behind and away from the brake pad, the protective sheet including resilient tongues projecting inwardly beyond its radially inner edge, at least part of the resilient tongues being bent out of the plane of the remainder of the protective sheet and being clampingly received between the groove side faces, the radially inner edge of the sleeve being axially spaced behind and away from the annular groove, said sheet being arranged that, during use, air circulates at both sides of said sheet, said resilient tongues being twisted about a radial axis of their own so as to engage the front and rear side faces of said groove.

4. The actuator as claimed in any one of claims 1 to 3, wherein the side faces of said annular groove converge radially inwardly.

5. The actuator as claimed in any one of claims 1 to 3, wherein all the resilient tongues are disposed in a sector of the annular protective sheet extending throughout no more than 180°, and the inner edge of the protective sheet is spaced at reduced distance from the piston axis in an area opposite said sector.

6. The actuator as claimed in any one of claims 1 to 3, wherein the piston has a second annular groove which is spaced axially behind said annular groove arresting said protective sheet, said second annular groove accommodating the radially inner edge of said sleeve.

* * * * *